United States Patent [19]

Shiotsuki et al.

[11] Patent Number: 5,455,963
[45] Date of Patent: Oct. 3, 1995

[54] METHOD OF SWITCHING VOICE CHANNELS IN A MOBILE COMMUNICATION SYSTEM

[75] Inventors: Hirofumi Shiotsuki; Yoshinori Hashimoto, both of Tokyo, Japan

[73] Assignee: NEC Corporation, Tokyo, Japan

[21] Appl. No.: 157,297

[22] Filed: Nov. 26, 1993

[30] Foreign Application Priority Data

Nov. 27, 1992 [JP] Japan ................................. 4-317629

[51] Int. Cl.⁶ ............................................. H04M 11/00
[52] U.S. Cl. ....................... 455/33.2; 455/56.1; 379/60
[58] Field of Search .................................. 455/33.2, 33.4, 455/56.1, 62; 379/60

[56] References Cited

U.S. PATENT DOCUMENTS

| | | | |
|---|---|---|---|
| 5,175,867 | 12/1992 | Wejke et al. | 455/33.2 |
| 5,241,685 | 8/1993 | Bodin et al. | 455/33.2 |
| 5,276,907 | 1/1994 | Meidan | 379/60 |
| 5,319,795 | 6/1994 | Hamabe et al. | 379/60 |

FOREIGN PATENT DOCUMENTS 0505341  9/1992  European Pat. Off. .

*Primary Examiner*—Reinhard J. Eisenzopf
*Assistant Examiner*—Andrew Faile
*Attorney, Agent, or Firm*—Sughrue, Mion, Zinn, Macpeak & Seas

[57] ABSTRACT

If the present voice channel activity ratio ($\alpha$) of a first radio base station used as an original radio base station is smaller than a threshold ($\Delta CH$) and the present voice channel activity ratio ($\beta$) of a second radio base station used as a destination radio base station is equal to or greater than the threshold ($\Delta CH$), a predetermined threshold ($\Delta AB$) for determining the difference between the levels (Ra) and (Rb) of electric fields received from a mobile terminal by the first and second radio base stations is corrected with a value (X) to produce a new threshold ($\Delta AB+X$). If the present voice channel activity ratio ($\alpha$) of the first radio base station is equal to or greater than the threshold ($\Delta CH$) and the present voice channel activity ratio ($\beta$) of the second radio base station is smaller than the threshold ($\Delta CH$), the threshold ($\Delta AB$) is corrected with a value (Y) to produce a new threshold ($\Delta-Y$). If the difference between the levels (Rb) and (Ra) is equal to or greater than the threshold for determining the difference between the levels (Rb) and (Ra), a call is rerouted from the first radio base station to the second radio base station.

2 Claims, 2 Drawing Sheets

METHOD OF SWITCHING VOICE CHANNELS IN A MOBILE COMMUNICATION SYSTEM

BACKGROUND OF THE INVENTION

1. Field of the Invention

The present invention relates to a method of controlling the traffic intensity of radio base stations in a mobile communication system which has a plurality of mobile terminals, a plurality of radio base stations having a plurality of voice channels for radio communications with the mobile terminals in a plurality of radio service areas in which the mobile terminals are movable, and a mobile telephone switching office for governing the radio base stations to control connection of calls to and from the mobile terminals and selection of voice channels.

2. Description of the Prior Art

One conventional traffic control process for use in a cellular mobile communication system effects a quasi hand-off process, referred to as a "directed retry" process proposed by EIA (Electronic Industry Association) and TACS (Total Access Communication System), on a control channel when a new call is made while all the voice channels of a certain radio base station are in use. According to the directed retry process, when a new call is made while all the voice channels of a certain radio base station are in use, the mobile telephone switching office uses the control channel of the radio base station of which all voice channels are in use to send control channel information of nearby radio base stations which have an idle voice channel to a calling or called mobile terminal in a radio service area covered by the radio base station. Based on the control channel information supplied from the mobile telephone switching office, the mobile terminal selects a control channel with a sufficient electric field reception level from the nearby radio base stations and again attempts to make a call using the selected control channel.

For smoothly carrying out the directed retry process, there has been proposed a process for effecting call-connecting hand-off by collecting information on electric field reception levels between the radio base station and nearby radio base stations. Such a proposed process will first be described with reference to FIG. 1 of the accompanying drawings. FIG. 1 shows a general mobile communication system which comprises a mobile terminal 4, a plurality of radio base stations 2 and 3, and a mobile telephone switching office 1 for governing radio base stations 2 and 3 and connecting calls and providing communication service between subscribers and the mobile terminal 4. The radio base stations 2 and 3 can effect radio communication with the mobile terminal 4 in radio service areas A, B. A typical hand-off control process in the mobile communication system will next be described with reference to FIG. 1. The mobile telephone switching office 1 controls radio base station 2, which is providing communication service, and nearby radio base station 3 to measure the level of the electric field received from the mobile terminal 4, and collects the measured data. In the hand-off process, radio base station 2, which is providing communication service, is the original radio base station from which the call is to be rerouted or transferred, and nearby radio base station 3 is the destination radio base station to which the call is to be rerouted. If (the level of the electric field received by the destination radio base station)—(the level of the electric field received by the original radio base station) $\geq \Delta$, the mobile telephone switching office 1 transfers the call from the original radio base station to the destination radio base station. Value $\Delta$ may be established in advance for each hand-off route in the mobile telephone switching office 1 by a radio planner depending on the geometrical conditions. For example, it is assumed that value $\Delta$ is set to $\Delta AB$ when a call is to be rerouted from radio service area A of radio base station 2 to radio service area B of radio base station 3, and value $\Delta$ is set to $\Delta BA$ when a call is to be rerouted from radio service area B of radio base station 3 to radio service area A of radio base station 2. When the mobile terminal 3 moves from radio service area A to radio service area B, a call is rerouted from radio service area A to radio service area B if (the level of the electric field received by radio base station 3)—(the level of the electric field received by radio base station 2)$\geq \Delta AB$. Conversely, when the mobile terminal 3 moves from radio service area B to radio service area A, a call is rerouted from radio service area B to radio service area A if (the level of the electric field received by radio base station 2)—(the level of the electric field received by radio base station 3)$\geq \Delta BA$.

The conventional directed retry process and hand-off process have to satisfy the conditions that the control channel of nearby radio base stations other than the radio base station for which all voice channels are in use are received at a sufficient electric field level and that there is also an idle voice channel available. Consequently, the unwanted delay required from the time when a call is made to the time when the call is actually connected, i.e., the time when a call is established in a voice channel, may be lengthy depending on the number of attempts made to connect the call.

SUMMARY OF THE INVENTION

It is an object of the present invention to provide a method of controlling the traffic intensity of radio base stations in a mobile communication system for effectively connecting calls between a mobile terminal and the radio base stations based on two items of information, i.e., information representative of a voice channel activity ratio of nearby radio base stations governed by a mobile telephone switching office and information indicative of electric field levels that can be received.

To achieve the above object, there is provided in accordance with the present invention a method of controlling the traffic intensity of radio base stations in a mobile communication system having a plurality of mobile terminals, a plurality of radio base stations having a plurality of voice channels for radio communication with the mobile terminals in a plurality of radio service areas in which the mobile terminals are movable, and a mobile telephone switching office for governing the radio base stations to control connection of calls to and from the mobile terminals and selection of voice channels, the method comprising the steps of: measuring the level (Ra) of an electric field from a mobile terminal which is received by a first radio base station as an original radio base station and the level (Rb) of an electric field from the mobile terminal which is received by a second radio base station as a destination radio base station, and collecting the measured levels (Ra), (Rb) from the first and second radio base stations; if the present voice channel activity ratio ($\alpha$) of the first radio base station is smaller than a threshold ($\Delta CH$) and the present voice channel activity ratio ($\beta$) of the second radio base station is equal to or greater than the threshold ($\Delta CH$), correcting a predetermined threshold ($\Delta AB$) for determining the difference between levels (Ra) and (Rb) with a value (X) to produce a new threshold (ΔAB+X); if the present voice channel activity ratio (α) of the first radio base station is equal to or greater than the threshold (ΔCH) and the present voice channel activity ratio (β) of the second radio base station is smaller than the threshold (ΔCH), correcting the predetermined threshold (ΔAB) with a value (Y) to produce a new threshold (ΔAB−Y); and comparing the difference between levels (Rb) and (Ra) with the threshold for determining the difference between levels (Rb) and (Ra), and transferring a call from the first radio base station to the second radio base station only if the difference between levels (Rb) and (Ra) is equal to or greater than the threshold for determining the difference between levels (Rb) and (Ra).

When the original radio base station has more idle voice channels and the destination radio base station has fewer idle voice channels, the threshold for determining the difference between the levels of the received electric fields is increased for a smaller chance of call rerouting. Conversely, when the original radio base station has fewer idle voice channels and the destination radio base station has more idle voice channels, the threshold for determining the difference between the levels of the received electric fields is reduced for a greater chance of call rerouting.

Upon an increase in the traffic intensity in the area of a certain radio base station, the threshold for determining the difference between reception electric field levels of that radio base station and a nearby radio base station is corrected based on the voice channel activity ratios. The method according to the present invention is carried out in a stage prior to the directed retry process. While the directed retry process is effective only when the mobile terminal which transmits or receives a newly made call is positioned in an overlapping area between the ratio service areas, the method according to the present invention allows a call to be connected irrespective of the position of the mobile terminal, and hence can distribute calls among the radio base stations for traffic dispersion. With the method according to the present invention, the delay required to connect a call is not increased depending on the number of attempts made to connect the call, unlike the directed retry process. Furthermore, the method according to the present invention is effective in reducing the chance that the directed retry process will be carried out.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
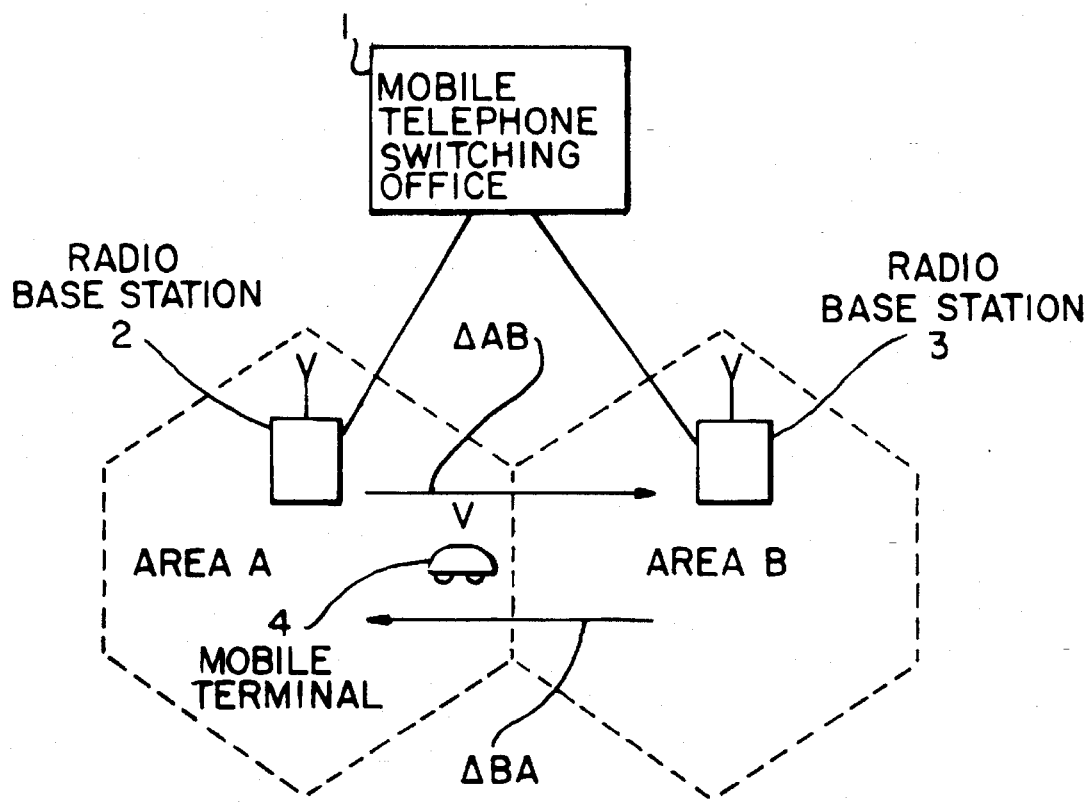
FIG. 1 is a block diagram of a prior art mobile communication system.
Figure 2:
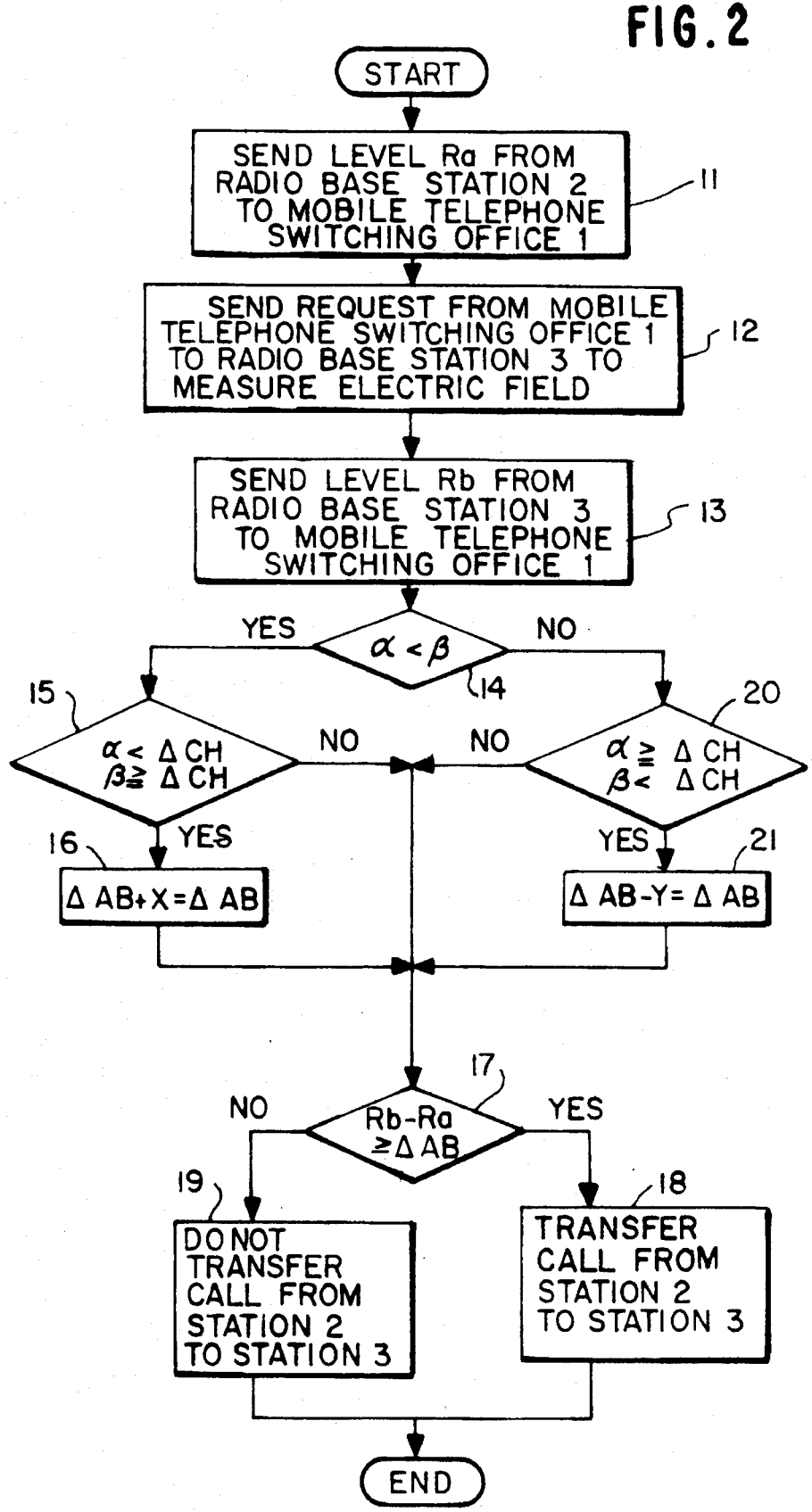
FIG. 2 is a flowchart of an operation sequence of a method of controlling the traffic intensity of radio base stations in the mobile communication system according to the present invention.

A method of controlling the traffic intensity of radio base stations in a mobile communication system according to the present invention will be described below with reference to FIG. 2. FIG. 2 shows an operation sequence of a hand-off process for rerouting a call from radio base station 2 to radio base station 3 in the mobile communication system shown in FIG. 1.

First, radio base station 2 in radio service area A sends a reception electric field level Ra to the mobile telephone switching office 1 in a step 11. Then, the mobile telephone switching office 1 requests nearby radio base station 3 to measure a received electric field in a step 12. In response to the request, radio base station 3 measures the electric field, and sends a reception electric field level Rb to the mobile telephone switching office 1 in a step 13.

Thereafter, the mobile telephone switching office 1 compares the present voice channel activity ratio α (%) of radio base station 2 with the present voice channel activity ratio β (%) of radio base station 3 in a step 14. The voice channel activity ratio is defined as the ratio of the number of voice channels in use to the total number of voice channels. If voice channel activity ratio α is smaller than voice channel activity ratio β, the mobile telephone switching office 1 determines in a step 15 whether or not voice channel activity ratio α is smaller than a voice channel activity ratio threshold ΔCH and also whether voice channel activity ratio β is larger than or equal to voice channel activity ratio threshold ΔCH. If voice channel activity ratio α is smaller than voice channel activity ratio threshold ΔCH and voice channel activity ratio β is larger than or equal to voice channel activity ratio threshold ΔCH, the mobile telephone switching office 1 adds a value X to a predetermined threshold ΔAB for determining reception electric field levels, and uses the sum as a new threshold ΔAB in a step 16 in order to make maximum use of the voice channels of radio base station 2, thereby making the conditions for determining reception electric field levels stricter. If both voice channel activity ratios α, β are equal to or greater than, or equal to or smaller than voice channel activity ratio threshold ΔCH, threshold ΔAB remains unchanged. After steps 15 and 16, the mobile telephone switching office 1 determines whether or not the difference between the reception electric field levels Ra and Rb is equal to or greater than threshold ΔAB in a step 17. If the difference between reception electric field levels Ra and Rb is equal to or greater than threshold ΔAB, the mobile telephone switching office 1 transfers a call from radio base station 2 to radio base station 3 in a step 18. If not, the mobile telephone switching office 1 does not transfer a call from radio base station 2 to radio base station 3 in a step 19.

If voice channel activity ratio β is equal to or smaller than voice channel activity ratio α, the mobile telephone switching office 1 determines in a step 20 whether or not voice channel activity ratio α is equal to or greater than voice channel activity ratio threshold ΔCH and also whether voice channel activity ratio threshold ΔCH. If voice channel activity ratio α is equal to or greater than voice channel activity ratio threshold ΔCH and voice channel activity ratio β is smaller than voice channel activity ratio threshold ΔCH, the mobile telephone switching office 1 deduces a value Y from threshold ΔAB, and uses the difference as a new threshold ΔAB in a step 21 in order to make maximum use of the voice channels of the radio base station 3, thereby making the conditions for determining reception electric field levels less strict. If both voice channel activity ratios α and β are equal to or greater than, or equal to or smaller than voice channel activity ratio threshold ΔCH, threshold ΔAB remains unchanged. After steps 20 and 21, the mobile telephone switching office 1 determines whether or not the difference between reception electric field levels Ra and Rb is equal to or greater than threshold ΔAB in step 17. If the difference between reception electric field levels Ra and Rb is equal to or greater than threshold ΔAB, the mobile telephone switching office 1 transfers a call from radio base station 2 to radio base station 3 in step 18. If not, mobile telephone switching office 1 does not transfer a call from radio base station 2 to radio base station 3 in step 19.

Values X and Y may be calculated based on voice channel activity ratios α and β.

An example of operation according to the hand-off process will be described below. It is assumed that threshold ΔAB is 4, reception electric field level Ra is 5, reception electric field level Rb is 10, and voice channel activity ratio threshold ΔCH is 80 (%).

If voice channel activity ratio α is 30 (%) and voice channel activity ratio β is 90 (%), voice channel activity ratio α is smaller than voice channel activity ratio threshold ΔCH, i.e., there are more idle voice channels available, and voice channel activity ratio β is in excess of voice channel activity ratio threshold ΔCH, i.e., there are fewer idle voice channels available. Therefore, in order to make maximum use of the voice channels of radio base station 2, threshold ΔAB is increased in step 16. If value X is 2, the new threshold ΔAB becomes 4+2=6. Therefore, since the difference (=5) between reception electric field levels Rb and Ra is smaller than ΔAB (=6) in step 17, a call is not rerouted from radio base station 2 to radio base station 3 in step 19.

If voice channel activity ratio α is 90 (%) and voice channel activity ratio β is 30 (%), voice channel activity ratio α is in excess of voice channel activity ratio threshold ΔCH, i.e., there are fewer idle voice channels available, and voice channel activity ratio β is smaller than voice channel activity ratio threshold ΔCH, i.e., there are more idle voice channels available. Therefore, in order to make maximum use of the voice channels of radio base station 2, threshold ΔAB is reduced in step 21. If value Y is 1, the new threshold ΔAB becomes 4−1=3. Therefore, since the difference (=5) between reception electric field levels Rb and Ra is greater than ΔAB (=3) in step 22, a call is rerouted from radio base station 2 to radio base station 3 in step 23.

If voice channel activity ratio α is 30 (%) and voice channel activity ratio β is 50 (%), both voice channel activity ratios α and β are smaller than voice channel activity ratio threshold ΔCH, i.e., there are more idle voice channels available. Inasmuch as no priority is given to the voice channels of radio base station 2 or the voice channels of radio base station 3, threshold ΔAB remains unchanged in this case. Because the difference (=5) between reception electric field levels Rb and Ra is greater than ΔAB (=4) in step 17, a call is rerouted from radio base station 2 to radio base station 3 in step 18.

If voice channel activity ratio α is 85 (%) and voice channel activity ratio β is 90 (%), both voice channel activity ratios α and β are in excess of voice channel activity ratio threshold ΔCH, i.e., there are fewer idle voice channels available. Inasmuch as no priority is given to the voice channels of radio base station 2 or the voice channels of radio base station 3, threshold ΔAB remains unchanged in this case. Because the difference (=5) between reception electric field levels Rb and Ra is greater than ΔAB (=4) in step 17, a call is rerouted from radio base station 2 to radio base station 3 in step 18.

Threshold ΔAB, which is used to determine whether a call is to be transferred from radio base station 2 to radio base station 3, is summarized as follows:

1) If voice channel activity ratio α of the original radio base station 2 is smaller than threshold ΔCH and voice channel activity ratio β of the destination radio base station 3 is equal to or greater than threshold ΔCH, the value (ΔAB+X) is used as the threshold to determine whether a call is to be transferred from radio base station 2 to radio base station 3.

2) If voice channel activity ratio α of the original radio base station 2 is equal to or greater than threshold ΔCH and voice channel activity ratio β of the destination radio base station 3 is smaller than threshold ΔCH, the value (ΔAB−Y) is used as the threshold to determine whether a call is to be transferred from radio base station 2 to radio base station 3.

3) If both voice channel activity ratios a and β of the original and destination radio base stations 2 and 3 is smaller than threshold ΔCH, threshold ΔAB is used as it is to determine whether a call is to be transferred from radio base station 2 to radio base station 3.

4) If both voice channel activity ratios α and β of the original and destination radio base stations 2 and 3 are equal to or greater than threshold ΔCH, threshold ΔAB is used as it is to determine whether a call is to be transferred from radio base station 2 to radio base station 3.

The principles of the above process of controlling the transfer of a call from radio base station 2 to radio base station 3 may also be used to control the transfer of a call from radio base station 3 to radio base station 2.

Although a certain preferred embodiment of the present invention has been shown and described in detail, it should be understood that various changes and modifications may be made therein without departing from the scope of the appended claims.

What is claimed is:

1. A method of switching voice channels in a mobile communication system having a plurality of mobile terminals, a plurality of radio base stations having a plurality of voice channels for radio communications with the mobile terminals in a plurality of radio service areas in which the mobile terminals are movable, and a mobile telephone switching office for governing the radio base stations to control connection of calls to and from the mobile terminals and selection of voice channels, said method comprising the steps of:

measuring a first level of an electric field from a mobile terminal which is received by a first radio base station as an original radio base station and a second level of an electric field from the mobile terminal which is received by a second radio base station as a destination radio base station, and collecting said first and second levels from the first and second radio base stations;

if a first present voice channel activity ratio of the first radio base station is smaller than a first threshold and a second present voice channel activity ratio of the second radio base station is equal to or greater than said first threshold, increasing a second threshold by a first value in order to determine the difference between said first and said second level;

if the first present voice channel activity ratio of the first radio base station is equal to or greater than said first threshold and the second present voice channel activity ratio of the second radio base station is smaller than said first threshold, decreasing said second threshold by a second value in order to determine the difference between said first and said second level; and comparing the difference between said first level and said second level with said second threshold, and transferring a call from said first radio base station to said second radio base station only if the difference between said second level and said first level is equal to or greater than said second threshold.

2. The method according to claim 1 that further comprises the step of obtaining said first and second values based on said first and second voice channel activity ratios.

* * * * *